(12) United States Patent
Hunter et al.

(10) Patent No.: US 7,539,287 B2
(45) Date of Patent: May 26, 2009

(54) SYSTEM AND METHOD FOR MEASURING INTERACTIVE VOICE RESPONSE APPLICATION EFFICIENCY

(75) Inventors: Phillip W. Hunter, Plano, TX (US); Jenny Panzarella Burr, Plano, TX (US)

(73) Assignee: InterVoice Limited Partnership, Dallas, TX (US)

( * ) Notice: Subject to any disclaimer, the term of this patent is extended or adjusted under 35 U.S.C. 154(b) by 266 days.

(21) Appl. No.: 10/939,009

(22) Filed: Sep. 10, 2004

(65) Prior Publication Data
US 2005/0036594 A1 Feb. 17, 2005

Related U.S. Application Data

(62) Division of application No. 09/888,683, filed on Jun. 25, 2001, now Pat. No. 6,810,111.

(51) Int. Cl.
*H04M 1/24* (2006.01)
(52) U.S. Cl. ................... 379/1.02; 379/88.09
(58) Field of Classification Search ............... 379/1.02, 379/10.03, 67.1, 88.08, 88.16, 88.1, 201.03, 379/88.09
See application file for complete search history.

(56) References Cited

U.S. PATENT DOCUMENTS

| | | | |
|---|---|---|---|
| 5,583,965 A | 12/1996 | Douma et al. | |
| 5,822,397 A | 10/1998 | Newman | |
| 6,094,476 A * | 7/2000 | Hunt et al. | 379/88.04 |
| 6,219,643 B1 * | 4/2001 | Cohen et al. | 704/257 |
| 6,366,879 B1 | 4/2002 | Coxhead et al. | |
| 6,400,807 B1 | 6/2002 | Hewitt et al. | |
| 6,405,149 B1 | 6/2002 | Tsai et al. | |
| 6,405,170 B1 * | 6/2002 | Phillips et al. | 704/270 |
| 6,516,051 B2 | 2/2003 | Sanders | |
| 6,598,022 B2 | 7/2003 | Yuschik | |
| 6,606,598 B1 * | 8/2003 | Holthouse et al. | 704/275 |
| 6,741,697 B2 * | 5/2004 | Benson et al. | 379/265.02 |
| 6,810,111 B1 | 10/2004 | Hunter et al. | |
| 6,823,054 B1 * | 11/2004 | Suhm et al. | 379/134 |
| 2002/0006186 A1 * | 1/2002 | Sanders | 379/1.01 |
| 2002/0069064 A1 | 6/2002 | Dejaco et al. | |
| 2002/0077819 A1 | 6/2002 | Girardo | |

OTHER PUBLICATIONS

U.S. Appl. No. 60/276,266.*
U.S. Appl. No. 60/273,710.*

* cited by examiner

*Primary Examiner*—Olisa Anwah
(74) *Attorney, Agent, or Firm*—Fulbright & Jaworski L.L.P.

(57) ABSTRACT

The present invention relates generally to monitoring performance of interactive automated customer applications and more particularly to monitoring performance of an interactive voice response (IVR) system. The present invention monitors IVR state changes in an IVR application. The present invention appends IVR state changes to a history log to allow performance monitoring. Specifically, the present invention logs successful goal completion states (in addition to other information) in the history log where successful goal completion states are associated with a plurality of events associated with said IVR application.

21 Claims, 2 Drawing Sheets

SYSTEM AND METHOD FOR MEASURING INTERACTIVE VOICE RESPONSE APPLICATION EFFICIENCY

CROSS-REFERENCE TO RELATED APPLICATIONS

The present invention is a divisional of U.S. patent application Ser. No. 09/888,683, filed Jun. 25, 2001, now U.S. Pat. No. 6,810,111 entitled "SYSTEM AND METHOD FOR MEASURING INTERACTIVE VOICE RESPONSE APPLICATION EFFICIENCY," to which priority is hereby claimed and which is hereby incorporated by reference herein.

TECHNICAL FIELD

The present invention relates generally to monitoring performance of interactive automated customer applications and more particularly to monitoring performance of an interactive voice response (IVR) system.

BACKGROUND OF THE INVENTION

Interactive voice response (IVR) systems allow an individual to interact with a database related system to acquire information and/or perform transactions associated with the database by telephone and/or by other data networks such as the Internet. IVR systems allow transactions to occur without interaction with user agents. For example, banks and credit card companies use IVR systems so that their customers can receive up-to-date account information instantly and easily without having to speak directly to a person.

IVR systems typically receive input information by presenting scripted requests for information to users and allowing users to answer questions either verbally or by pushing the numbers on a touch-tone telephone. Frequently, IVR systems will present a series of menus to a user, allowing the user to select various options. Additionally, users may enter other input information, such as an account number and a personal authorization code. The various menus and requests for input information occur by executing a script or program. Clearly, such scripts or programs can be quite complex.

To determine how well an IVR application is serving callers, IVR systems have utilized frequency analysis. Specifically, IVR applications measure the number of times that specific options are selected. For example, a banking IVR application may measure the number of times that customers select menu options associated with account balance inquiry, funds transfer, stop payment request, and/or the like. Although this information is useful for analyzing application performance, it is quite limited.

BRIEF SUMMARY OF THE INVENTION

The present invention is directed to a system and method which analyze how well caller goals are achieved in interactive voice response applications. The IVR applications may accept speech, touch tone, or other inputs. The system and method preferably identify the potential points of the beginning, the completion, the incompletion, and failure of each goal. These points within the application call flow may be selected during the application design. During the programming of the application, certain data about each goal event is preferably specified to be recorded to the application platform storage media. A reporting tool is preferably used to aggregate and summarize the data, giving the efficiency results needed to understand the performance of the IVR application.

The present invention recognizes that caller goals frequently span multiple events. Thus, the present invention is able to analyze how well IVR applications perform with respect to interrelated events of a discrete goal, rather than simply measuring the number of times that a single menu option is selected.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
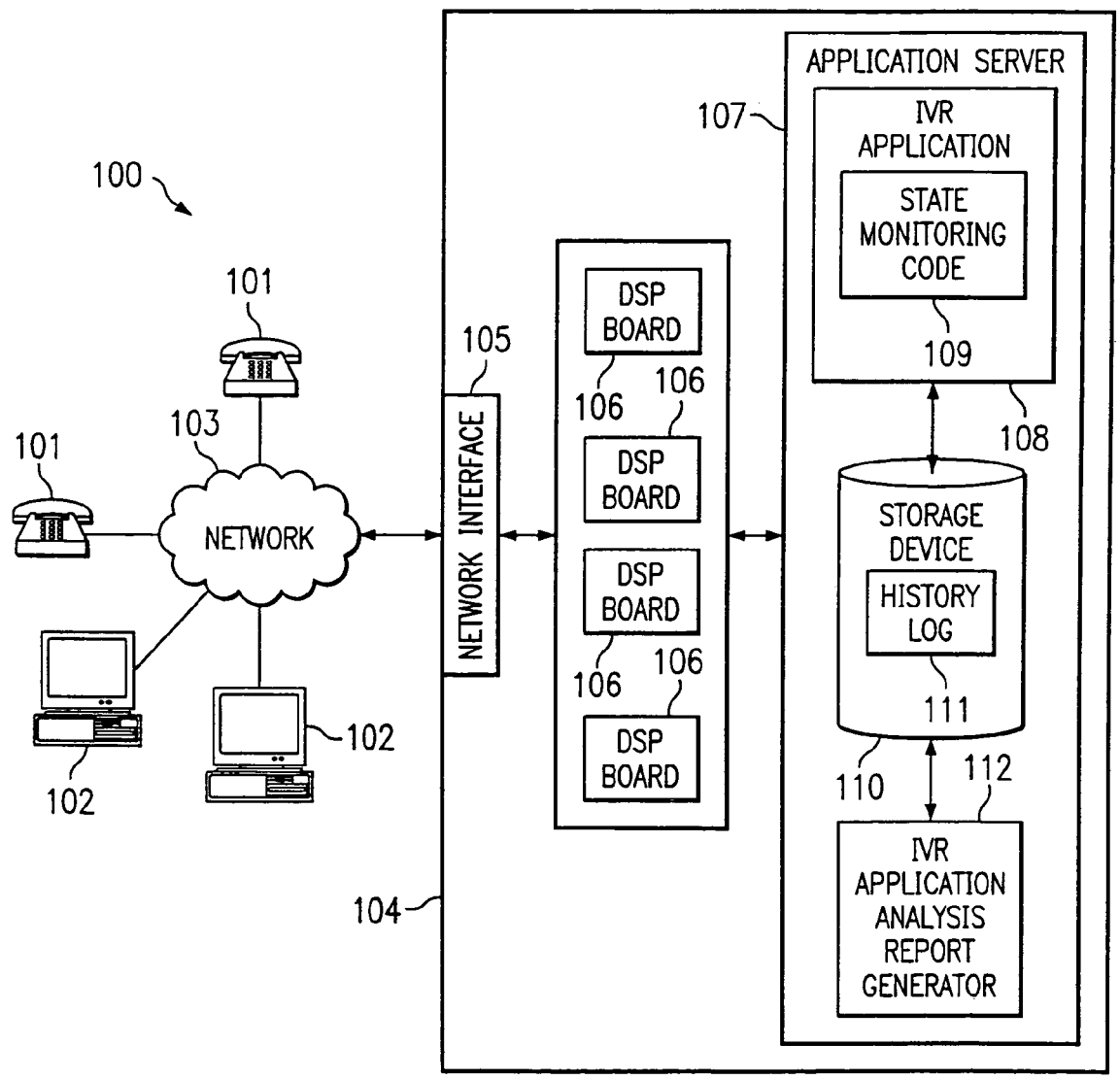
FIG. 1 depicts an exemplary system arrangement according to an embodiment of the present invention.

FIG. 1 depicts an exemplary system arrangement according to an embodiment of the present invention. System 100 includes user devices such as telephones 101 and personal computers 102. The user devices are connected via network 103 to communicate with automated messaging platform 104. Network 103 may be the public switched telephone network (PSTN) or the Internet.

Automated messaging platform 104 includes network interface 105 to connect to network 103. Automated messaging platform 104 comprises a plurality of digital signal processor (DSP) boards 106 to process various communication streams associated with incoming and outgoing communications via network interface 105. Automated messaging platform 104 further comprises application server 107 to implement various automated telephony applications.

The present invention preferably operates in connection with an IVR application that utilizes speech recognition. Algorithmic executable code to process speech data may be executed on the various DSPs of DSP boards 106. For example, executable code for speech recognition may include the steps of: spectral representation, segmentation, phonetic classification, and search and matching utilizing a "n-best" list of predefined lexicographical elements. Additionally, the various DSPs may perform text to speech conversion for communication to the user devices. The various DSPs may execute code to perform various communication protocols to provide multimedia capabilities. For example, executable code to implement various fax applications. Although system automated messaging platform 104 has been depicted to utilize DSP boards 106, other implementations may be utilized. For example, speech and signal processing may occur via software executed on processors associated with application server 107 if desired.

DSP boards 106 are coupled to application server 107. Application server 107 executes various applications that utilize information processed by the respective DSPs of DSP boards 106. Application server 107 is preferably a multiprocessor computer system capable of concurrently processing numerous calls. For example, an appropriate UNIX multiprocessor server may be utilized. Application server 107 may comprise a plurality of processors, random access memory (RAM), read only memory (ROM), storage devices, and appropriate user interfaces. Also, application server 107 may execute any number of applications including IVR application 108. IVR application 108 includes state monitoring code which appends state records to history log 111 on storage device 110 according to the present invention.

IVR application 108 allows users associated with the user devices (telephones 101 and PC 102) to obtain information or perform transactions. The users may interact with IVR application 108 utilizing a touch-tone or dual-tone multifrequency (DTMF) user interface. Also, the users may interact with IVR application 108 via voice responses.

IVR application 108 presents to users various options for retrieving information or performing transactions. In response to user input, IVR application 108 responds with desired information, completes the respective transaction, or executes an error process. State monitoring code of IVR application 108 in response to state changes (such a retrieval of desired information, completion of a transaction, or execution of an error process) creates state records which are appended to history log 111. By creating such state records, goal completion information and application efficiency related to IVR application 108 may be analyzed. Thus, IVR application 108 includes IVR application analysis report generator 112. IVR application analysis report generator 112 retrieves information from history log 111, calculates relevant aggregate statistics, and formats the calculated statistics for output to a report file.

It shall be appreciated that system 100 is merely exemplary. The present invention may be practiced utilizing any system architecture suitable for an IVR application. Also, the IVR architecture may be a distributed architecture utilizing numerous system components located in various locations. The present invention may operate with connection with any type of IVR application. For example, state record creation may be associated with banking, medical, or governmental IVR applications. To provide a greater understanding of the present invention, an exemplary banking IVR application shall be discussed. However, it shall be appreciated that the banking IVR application is not intended to limit the present invention.

Figure 2:
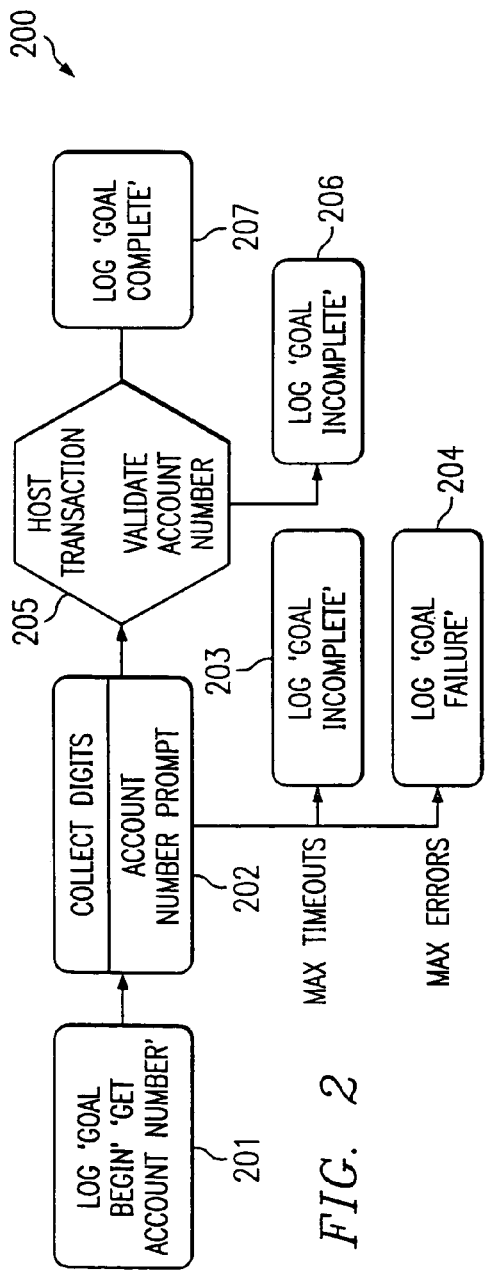
FIG. 2 depicts an exemplary flow chart of IVR states associated with a discrete goal arranged according to the present invention.

FIG. 2 depicts an exemplary flow chart of IVR states arranged according to the present invention. Flow chart 200 defines a series of IVR states for "Get Account Number" goal. Flow chart 200 represents a discrete series of steps or execution states associated with an IVR process or script that obtains a user's account number. The series or execution states may be implemented utilizing an appropriate IVR scripting language. For example, the IVR scripting language may allow an IVR developer to program the IVR script utilizing visual controls via a graphical user interface (GUI). The IVR script may be utilized to generate a high level program to perform the series of steps or execution states. The high level program may then be compiled and linked to generate code executable on application server 107. It shall be appreciated that the code utilized to implement the execution states associated with flow chart 200 may be developed utilizing any development environment. The present invention is not limited to any particular programming language or environment.

Flow chart 200 begins with an initial IVR state. State 201 is the "Goal Begin" state. In this state, the user has been presented with an audio request to enter the customer's account number. Also, at this point, a state record is appended to history log 111 indicating that a user has reached "Goal Begin" state associated with "Get Account Number" goal, i.e., indicating that this particular goal script or process has been initiated. The state flow continues to state 202 where the IVR code attempts to collect the digits from the user. The digits may be provided via a touch-tone of DTMF user interface or a voice interface. After reaching state 202, the state flow may transition to one of three states (states 203, 204, and 205).

If the user does not enter the user's complete account number within a predetermined number of timeouts, an error or incomplete state is reached (state 203). The incomplete state represents that the initiated goal was unable to continue successfully to completion. Preferably, a "Goal Incomplete; No Goal Selected" state record is created to indicate the incompletion of the initiated goal in history log 111.

It shall be appreciated that there is a difference between a goal failure and a goal incompletion. Specifically, a goal incompletion may represent the inability to complete a task due to non-application related issues. A goal failure may be related to the inability to complete a task due to a potential error or deficiency in the application. For example, if an electronic funds transfer is not completed due to insufficient fands in a customer's account, this represents a goal incompletion. However, it is not correlated to any problem with the application. Instead, this indicates that the application is doing exactly what it is designed to do (i.e., prevent an improper transfer of funds). Hence, this type of goal incompletion does not indicate that potential changes should be made to the application.

In this example, if a maximum number of errors in the collecting digits process occurs, state 204 is reached. State 204 represents a goal failure. The goal failure may occur due to any number of reasons such as noise on the communication line associated with the user. Alternatively, voice recognition code or software may be improperly tuned and may contribute to the error. State 204 indicates that there may be a potential issue with the application that could be remedied by modifying the system and/or software. Thus, if a maximum number of error occurs, the flow terminates and a failure is preferably indicated by appending a "Goal Failure; No Goal Selected" record in history log 111.

Assuming that the account number was obtained, state 202 transitions to state 205. At state 205, the input account number is validated. For example, the input account number may be compared to actual account numbers stored in a database. If the account number does not match an account number in the database, state 205 transitions to state 206. State 206 presents another incompletion point of the state flow where a "Goal Incomplete; Get Account Number; Host Problem" state record is appended to history log 111.

If the account number matches an account number in the database, state 205 transitions to state 207. State 207 represents a successful completion of the "Get Account Number" goal, i.e., a valid account number has been received from the user. At state 207, a state record reflecting successful completion of the "Get Account Number" goal is logged in history log 111.

Figure 3:
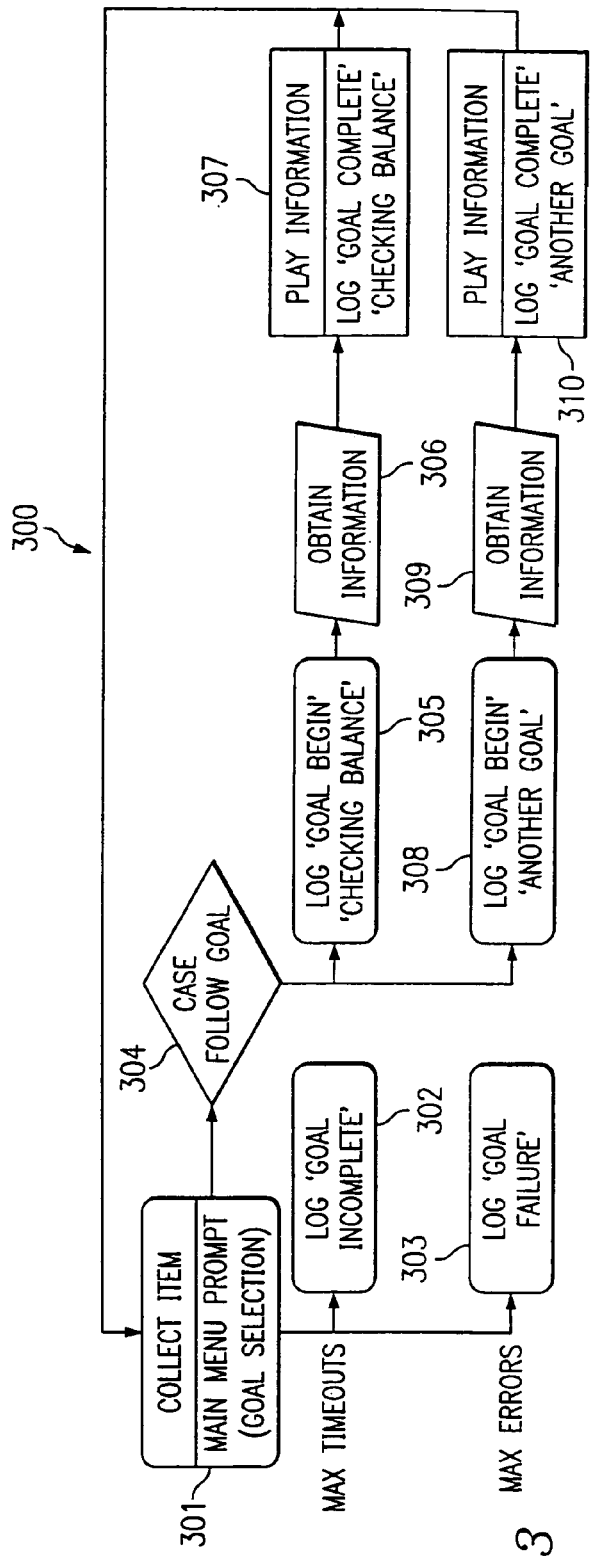
FIG. 3 depicts an exemplary flow chart of IVR states associated with a plurality of goals arranged according to the present invention.

FIG. 3 depicts an exemplary flow chart of IVR states associated with a plurality of discrete goals arranged according to the present invention. Flow chart 300 defines a series of IVR states for an entire IVR application. Flow chart 300 represents discrete series of steps or execution states associated with IVR processes or scripts that perform user initiated transactions. The discrete series or execution states of flow chart 300 may be implemented in the same way that the flow chart 200 may be implemented such as IVR scripting. A user may provide user input via a touch-tone or DTMF user interface or through a voice interface.

Flow chart 300 begins with "Collect Item" state 301. State 301 causes a state record to be appended to history log 111 indicating that a user has reached state 301. Also, a user is provided an audio menu to select a desired goal. State 301 may transition to state 302 if input is not received made within a predetermined amount of timeouts. State 302 will cause a goal incomplete record to be appended to history log 111. State 301 may transition to state 303 if a maximum number of errors occurs. State 303 will cause a goal failure record to be appended to history log 111. When a goal is properly selected via user input, state 304 performs a logical comparison to follow the selected goal by transitioning to the proper state.

If the user selected "Checking Balance" goal, the flow transitions to state 305. At state 305, a state record is logged or appended to history log 111 indicating that the user reached state 305. This may indicate that this particular goal script or process has been initiated. At state 306, user information is obtained. If successful, the flow transitions to state 307. Of course, if user information is not obtained, the flow may terminate due to failure or incompletion. Assuming that user information is obtained, the flow transitions to state 307. At state 307, the checking account information is played to the user and a state record indicating successful completion of "Checking Balance" goal is appended to history log 111. The flow then transitions back to state 301 to allow the user to select other goals if desired.

For example, the user may then select "Another Goal" goal. The flow may then eventually transition to state 308 where a state record indicating that a user has reached state 308 is logged or appended to history log 111. This may indicate that this particular goal script or process has been initiated. State 309 may obtain information from a user. State 310 may play pertinent information and log or append a successful completion state record to history log 111. Of course, it shall be appreciated that any number of goals or user selections may be implemented in this manner. Thus, an IVR application may thereby implement and monitor any number of user options as desired.

It shall be appreciated that flow chart 200 and flow chart 300 are merely exemplary. Any number of states may be utilized. For example, the IVR application may contain several nested menus for user selections. Also, it shall be appreciated that appending state records is not limited to state entry points and successful exit points. In fact, state records may be logged or appended for any type of state changes associated with an IVR application as deemed necessary by application developers. For example, state records may be created for incomplete or unsuccessful goal states. The incomplete or unsuccessful goal state records may provide explanation information such as caller timeout, hang up, command goal (caller selection of a command that terminates goal), data problem, system canceled (business rule disallowing goal, e.g., insufficient funds in account), shortcut (caller selects navigational shortcut to cancel goal), caller canceled explanations.

In an embodiment, the present invention defines data objects associated with discrete goals of an IVR application. The instances of the data objects are appended to history log 111 with state records according to execution of the IVR application. Other information may be included in the state record as such the date, time, reason for incompletion or failure of goal, and/or the like. Exemplary state records, including instances of goal data objects, may utilize the following format:

11212000,12:45:27,CheckingBalance,Begin,CallerSelected.
11212000,12:46:33,CheckingBalance,Complete,CallerSelected.
11212000,1:05:09,TransferFunds,Begin,CallerSelected.
11212000,1:07:09,TransferFunds,EnterAccount, NoSuchAccountNumber.
11212000,1:11:23,StopPayment,Begin,CallerSelected.
11212000,1:13:32,StopPayment,EnterCheckNumber, Timeout.

It shall be appreciated that the preceding are merely exemplary. Any format for state records may be utilized. Additionally, any form of data objection definitions may be utilized. For example, a discrete code may be associated with each IVR application state. The instances related to initialization of goals or completion of goals may be determined utilizing a table look-up operation. The formats and data object definitions do not require any specific characteristics. Instead, the formats and data objects need only provide sufficient information to indicate initialization of discrete goals and completion of said goals.

IVR application analysis report generator 112 retrieves information from history log 111, calculates relevant aggregate statistics, and formats the calculated statistics for an output report file. The report may provide any type of summarized data such as overall goal completion percentage over a defined time period, overall average number of goals completed per call, total number of calls begun, total number of goals begun, total number of goals successfully completed, total number of goals not completed, and/or total number of goals failed. Additionally, the report may provide such information on a goal by goal basis. The report may also segregate information by various criteria such as by date, time, and caller ID if desired. Report generator 112 may be operable to respond to system administrator configuration files to produce desired reports. The configuration files may specify desired specific goals, failure reasons, and/or the like for presentation in a particular report file or files. The report files may be presented to a system administrator via print outs, a graphical user interface (GUI), or any other suitable user interface.

Additionally, it shall be appreciated that several IVR applications may be executed on application server 107. Thus, state records may be appended to history log 111 for each such IVR application. The state records may reflect the originating IVR applications. Also, IVR report application analysis report generator 112 may produce summary information across all such applications and/or on an application by application basis.

It shall be appreciated that the present invention presents numerous advantages. In particular, the present invention recognizes that caller goals frequently span multiple events. Thus, merely tracking quantitative measure of event frequencies does not describe the interrelationship of events related across a common goal. Additionally, the present invention permits a determination of how well an IVR serves customer goals. Also, valuable information may be obtained by analyzing the reasons for goal failure. For example, if an "n-best" voice response prompt consistently exhibits failure, it is possible that the "n-best" options do not accurately reflect the customer's reasons for calling. For example, customers may frequently desire another option, such as obtaining tax information, which is not provided as part of the list of options. Such a repetitive failure of a goal may signal that the respective prompt should be rewritten to reflect customer desires. Alternatively, the signal processing associated with the "n-best" options might not be accurately tuned to perform voice data correlation. Moreover, the repetitive use of a navigation shortcut may cause IVR administrators to reprogram the IVR script to make a desired option appear earlier in the IVR process. Accordingly, the present invention makes a significant amount of customer information available to allow IVR applications to address efficient completion of customer goals.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system operable to monitor flow of information to and from at least one user remote from the system, said information flow having a plurality of points where operations are performed in accordance with data exchange between said system and said user, said system comprising;
    a plurality of operational goals, each operational goal corresponding to a desired result for said user and established at a selected information flow point from said plurality of flow points;
    means for receiving, from said selected information flow point, data indicative of a failure to properly complete a selected operation on goal established at said selected flow point; and
    means for storing received ones of said data indicative of failure, said data distinguishing between a failure of said selected operation goal and an incompletion of said selected operational goal.

2. The system of claim 1 wherein each of ones of said data indicative of failure includes reasons for said failure.

3. The system of claim 1 wherein said system further includes:
    means for aggregating statistics from said stored ones of data indicative of failure.

4. The system of claim 3 wherein said system further includes:
    means for generating reports based on said aggregated statistics.

5. The system of claim 4 wherein said aggregated statistics are selectively controlled by a system administrator.

6. The system of claim 3 wherein said aggregating means includes:
    means for combining statistics pertaining to more than one information flow point.

7. The system of claim 6 wherein said system further includes:
    means for presenting said combined statistics to a system administrator.

8. The system of claim 1 wherein said operation goal is a successful completion of a plurality of data exchanges.

9. The system of claim 1 wherein said at least one selected information flow point is a list of options, and wherein said failure to properly complete operational goal is said user fails to select one of said list of options.

10. The system of claim 9 wherein said failure is a result of said list not including a user desired option.

11. A system for monitoring an information flow between a user and an application, wherein said purpose of said information flow is a completion at least one application goal, said system comprising:
    a series of data transfers between said user and said application, wherein said transfers comprise a transaction;
    a state of said transaction that is defined as a failure of said goal of said application;
    a state of said transaction that is defined as incompletion of said goal of said application, wherein said goal failure is due to a deficiency of said application, and wherein said goal incompletion is due to a non-application related deficiency;
    a data object representing said failed goal; and
    a computer storage medium operable to store said data object in a table.

12. The system of claim 11 further comprising:
    a history log operable to store a plurality of said data objects; and an application analysis report generator operable to analyze said log and calculate at least one aggregate statistic.

13. The system of claim 11 further comprising:
    a graphic user interface operable to present an administrator of said application said at least one aggregate statistic.

14. The system of claim 11 wherein said transaction is completed by successful completion of a discrete series of script steps.

15. The system of claim 11 further comprising:
    a telephonic connection between said user and said application; and
    wherein said data transfer occurs, in part, by an interactive voice response (IVR) process.

16. A method of analyzing an information flow performed by a date exchange application, said method comprising:
    dividing a transaction between a user and said application into a series of data exchanges;
    defining a first sequence of states of said data exchanges as a failure of said transaction, and a second sequence of states of said data exchanges as a completion of said transaction;

defining a third sequence of states of said data exchanges as an incompletion of a goal. wherein said incompletion is not due to a failure of said application;
storing a record in a computer memory when said failure sequence occurs during a communication between a user and said application;
storing a record in said computer memory when said completion sequence occurs during a communication between a user and said application; and
generating a statistic from said stored records that reflect an ability of said application to perform said transaction.

17. The method of claim 16 wherein said completion of said goal is a culmination of successful completion of a plurality of said data exchanges.

18. The method of claim 16 wherein said statistic is one of goal completion percentage, average number of completed goals per transaction, total number of transactions begun, total number of goals begun, total number of goals completed, total number of goals not completed, and total number of goals failed.

19. The method of claim 16 further comprising:
using said statistic to locate a specific one of said data exchanges causing said application to be ineffective.

20. The method of claim 16 wherein said transaction includes s selection of preset options, and further comprising:
defining as said failure, a user desired option being absent from said preset options.

21. The method of claim 20 wherein said failure is a result of said user's desire for as option not provided by said application, and further comprising:
graphically representing a measure of how often said failure occurs.

* * * * *

UNITED STATES PATENT AND TRADEMARK OFFICE
CERTIFICATE OF CORRECTION

| | |
|---|---|
| PATENT NO. | : 7,539,287 B2 |
| APPLICATION NO. | : 10/939009 |
| DATED | : May 26, 2009 |
| INVENTOR(S) | : Phillip W. Hunter et al. |

It is certified that error appears in the above-identified patent and that said Letters Patent is hereby corrected as shown below:

In the Specification:

Column 4, Line 43, delete the portion of text reading "fands" and replace with --funds--.

In the Claims:

Column 7, Claim 1, Line 58, delete the portion of text reading "operation on goal" and replace with --operational goal--.

Column 7, Claim 1, Line 62, delete the portion of text reading "operation goal" and replace with --operational goal--.

Column 8, Claim 8, Line 18, delete the portion of text reading "operation goal" and replace with --operational goal--.

Column 8, Claim 9, Line 21, delete the portion of text reading "operational goal is said user fails" and replace with --said operational goal is said user's failure--.

UNITED STATES PATENT AND TRADEMARK OFFICE
CERTIFICATE OF CORRECTION

| | | |
|---|---|---|
| PATENT NO. | : 7,539,287 B2 | Page 2 of 2 |
| APPLICATION NO. | : 10/939009 | |
| DATED | : May 26, 2009 | |
| INVENTOR(S) | : Phillip W. Hunter et al. | |

It is certified that error appears in the above-identified patent and that said Letters Patent is hereby corrected as shown below:

Column 10, Claim 21, Line 12, delete the portion of text reading "as option"

and replace with --an option--.

Signed and Sealed this

Eleventh Day of August, 2009

David J. Kappos
*Director of the United States Patent and Trademark Office*